United States Patent
Ko et al.

(10) Patent No.: US 8,600,418 B2
(45) Date of Patent: Dec. 3, 2013

(54) RELAY STATION FOR CELL INFORMATION EXCHANGE BETWEEN ADJACENT BSS OVER AIR LINKS IN CELLULAR SYSTEMS

(75) Inventors: Gwangzeen Ko, Daejeon (KR); Chang Joo Kim, Daejeon (KR); Myung Sun Song, Daejeon (KR); Sung Hyun Hwang, Daejeon (KR); Sung Jin You, Daejeon (KR); Jung Sun Um, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 936 days.

(21) Appl. No.: 12/556,041

(22) Filed: Sep. 9, 2009

(65) Prior Publication Data

US 2010/0087216 A1    Apr. 8, 2010

Related U.S. Application Data

(60) Provisional application No. 61/095,675, filed on Sep. 10, 2008.

(30) Foreign Application Priority Data

Sep. 9, 2009  (KR) .................. 10-2009-0085025

(51) Int. Cl.
*H04B 7/00*  (2006.01)

(52) U.S. Cl.
USPC .......... 455/500; 455/11.1; 455/15; 455/422.1; 370/243; 370/315

(58) Field of Classification Search
USPC ........... 455/500, 7, 11.1, 15, 422.1, 424, 434, 455/445, 452.1; 370/243, 310, 312, 315, 370/329, 350, 534
See application file for complete search history.

(56) References Cited

U.S. PATENT DOCUMENTS

| | | | |
|---|---|---|---|
| 2004/0266338 A1* | 12/2004 | Rowitch ........................ | 455/7 |
| 2007/0178831 A1* | 8/2007 | Takeda et al. .................. | 455/7 |
| 2007/0249341 A1* | 10/2007 | Chu et al. ..................... | 455/434 |
| 2008/0170603 A1* | 7/2008 | Hyon et al. .................... | 375/214 |
| 2008/0205352 A1* | 8/2008 | Chu et al. ..................... | 370/336 |

FOREIGN PATENT DOCUMENTS

KR    1988-0005783 A    6/1988

* cited by examiner

*Primary Examiner* — Shaima Q Aminzay
(74) *Attorney, Agent, or Firm* — Ladas & Parry LLP (57) ABSTRACT

The present invention relates to relay customer premises equipment (RCPE) for exchanging operational information and coexistence information of each cell between adjacent cells in a cellular system. The present invention enables effective control between multiple cells by directly transmitting operational information and coexistence information between cells over air links.

13 Claims, 10 Drawing Sheets

RELAY STATION FOR CELL INFORMATION EXCHANGE BETWEEN ADJACENT BSS OVER AIR LINKS IN CELLULAR SYSTEMS

CROSS-REFERENCE TO RELATED PATENT APPLICATION

This application claims the benefit of U.S. Provisional Patent Application No. 61/095,675, filed on Sep. 10, 2008, in the U.S. Patent and Trademark Office, and Korean Patent Application No. 10-2009-0085025, filed on Sep. 9, 2009, in the Korean Intellectual Property Office, the disclosures of which are incorporated herein in their entirety by reference.

BACKGROUND OF THE INVENTION

1. Field of the Invention

The present invention relates to relay customer premises equipment (RCPE), and more particularly, to an RCPE for effectively exchanging operational information and coexistence information of each cell between adjacent cells in a base station (BS)-customer premises equipment (CPE) cellular system.

2. Description of the Related Art

Conventionally, information between cells is transmitted/received over a cable link so as to control a plurality of cells, which causes information transference delays and restrictions against reliable information exchange because cell operation information transmission depends on a protocol of an upper layer on the cable link. Also, since most conventional cell designs are aimed at data transmission between a base station (BS) and customer premises equipment (CPE), a scheme for easy information exchange between adjacent cells is required.

SUMMARY OF THE INVENTION

The present invention provides relay customer premises equipment (RCPE) for effectively transferring operational information and coexistence information of each cell between base stations (BSs) of adjacent cells over air links in a BS-customer premises equipment (CPE) cellular system.

The present invention also provides an apparatus for effectively transmitting operational information and coexistence information between cells over air links. In order to exchange information between cells over air links, functions of CPEs are considered to be important. Thus, the present invention provides an RCPE that enables information exchange with a neighboring cell by adding a CPE using a directional antenna or a beam-forming antenna for effective information transmission/reception with home BS, and an additional antenna and a transceiver for effective information relaying to another BS of the neighboring cell.

According to an aspect of the present invention, there is provided relay customer premises equipment (RCPE) for cell information exchange between base stations (BSs), the RCPE including at least two transceivers each of which transmits/receives cell information to/from a certain BS by using an antenna directed to the certain BS and which transfer the cell information to each other, and further comprising an interface that connects the at least two transceivers to each other and transfers cell information between station management entities (SMEs) of the at least two transceivers.

Each of the at least two transceivers may include an address filter that separates cell information having a transmission address corresponding to a home BS, from cell information having a transmission address corresponding to a BS with which another transceiver communicates; and an inter working function (IWF) execution unit that transmits the cell information having the transmission address corresponding to the BS with which the other transceiver communicates, to the other transceiver and receives the cell information having the transmission address corresponding to the home BS from the other transceiver, via the interface.

According to another aspect of the present invention, there is provided a method of exchanging cell information between base stations (BSs) by using relay customer premises equipment (RCPE) which is located in an area where communication performance is optimized with respect to cells of two or more BSs and has an antenna directed to a certain BS, the method including receiving cell information from at least one of the two or more BSs; and transmitting the cell information to a BS corresponding to a transmission address of the cell information by using an antenna directed to the BS.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining embodiments of the invention with reference to the attached drawings. Like reference numerals in the drawings denote like elements. In the following description of the present invention, a detailed description of known functions and configurations incorporated herein will be omitted when it may make the subject matter of the present invention unclear.

Unless defined differently, the terms "comprises", "comprising", "includes" and/or "including", when used herein, specify the presence of stated components, but do not preclude the presence or addition of one or more other components. Each of the stated components refers to a unit for processing at least one function or operation and may be implemented as hardware, software, or a combination of hardware and software.

A conventional base station (BS)-customer premises equipment (CPE) cellular system uses a cable link (ex, Backhaul) to transmit operational information and coexistence information between BSs. In the conventional cellular system using a cable link, a BS-CPE protocol (e.g., medium access control (MAC) layer functions) has to depend on an upper layer protocol (e.g., a transmission control protocol (TCP)/ Internet protocol (IP)) for operating the cable link. Accordingly, priority defined by the BS-CPE protocol and information reliability are determined according to the upper layer protocol and thus priority of information transmission may not be ensured or information may not be transferred.

The present invention enables effective information transmission over air links by using relay CPE (RCPE) including individual antennas each directed to a certain BS or one antenna having an adjustable transmission direction. The RCPE is located in an overlap area of two or more cells or near a cell edge, and relays operational/coexistence information, i.e., cell information, between BSs. The operational/coexistence information may be transmitted/received between BSs via a coexistence beacon protocol (CBP) packet. Operational information includes one or more types of information that influences resource allocation of a system, for example, information regarding a used channel, a maximum transmission power of the used channel, a traffic load, and a channel environment (received signal strength indication (RSSI) or signal-to-noise ratio (SNR)). Coexistence information includes information regarding a used channel, a list of available channels, channel numbers, priorities and the number of backup channels, a channel used by a neighboring BS, information required to coexist with an incumbent user (IU) such as a channel number used by the IU (coexistence with incumbent), or information required to coexist with a neighboring BS (self-coexistence).

Figure 1:
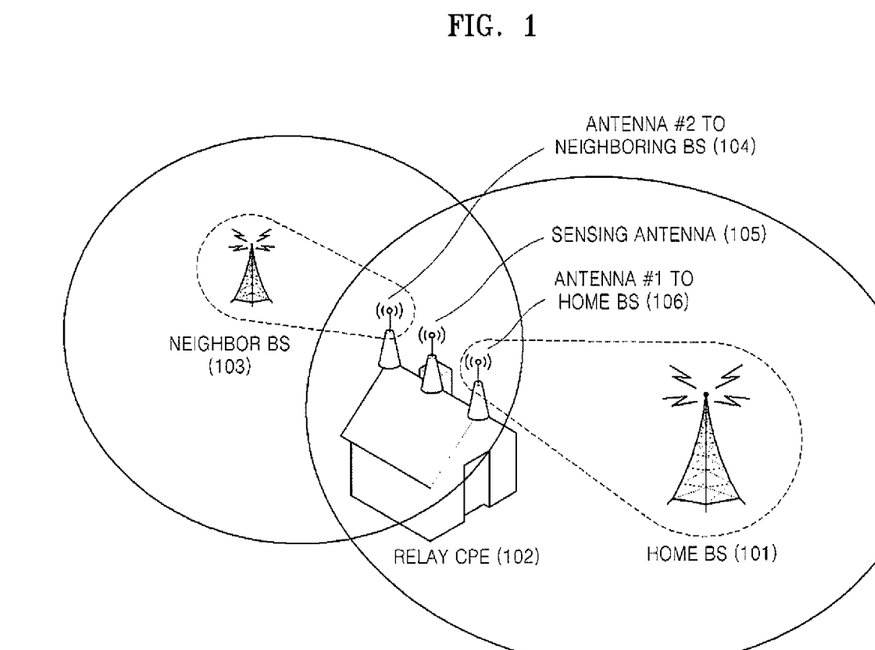
FIG. 1 illustrates an exemplary case when cell information is exchanged between adjacent cells by using relay customer premises equipment (RCPE) in a cell overlap area, according to an embodiment of the present invention.

FIG. 1 illustrates an exemplary case when cell information is exchanged between adjacent cells by using an RCPE in a cell overlap area, according to an embodiment of the present invention.

The RCPE accesses each BS of two cells so as to exchange information. The information may be transmitted by using a traffic slot under interference free scheduling such as intra/ inter frame scheduling.

Referring to FIG. 1, an RCPE 102 is located in an overlap area of two cells, i.e., an overlap area of a home cell covered by a home BS 101 and a neighboring cell covered by a neighboring BS 103. The RCPE 102 includes first and second antennas 106 and 104 respectively directed to the home BS 101 and the neighboring BS 103, and each of the first and second antennas 106 and 104 is connected to its own transmitter (physical (PHY)/MAC layers). The first and second antennas 106 and 104 are directional antennas and may have fixed or operator-adjustable directions and angles. Also, when beam-forming antennas are used, an operator may intellectually adjust one antenna to be directed to BSs or CPEs of a plurality of adjacent cells. The RCPE 102 may further include a sensing antenna 105 that is generally used for spectrum sensing in an IEEE 802.22 system. The sensing antenna 105 may not be included in a general system that does not need a sensing antenna. The RCPE 102 is a system that accesses the home BS 101 and transmits/receives data to/from the home BS 101 by using the first antenna 106. Additionally, the RCPE 102 may directly communicate with the neighboring BS 103 by using the second antenna 104. The RCPE 102 transmits operational/coexistence information of the neighboring BS 103 to the home BS 101 or transmits the operational/coexistence information of the home BS 101 to the neighboring BS 103 by using the second antenna 104 over a link formed with the neighboring BS 103. The RCPE 102 may always transmit the operational/coexistence information of the home BS 101 and the neighboring BS 103 via the second antenna 104 without an additional air link resource and thus information exchange over air links may be effectively performed.

Figure 2:
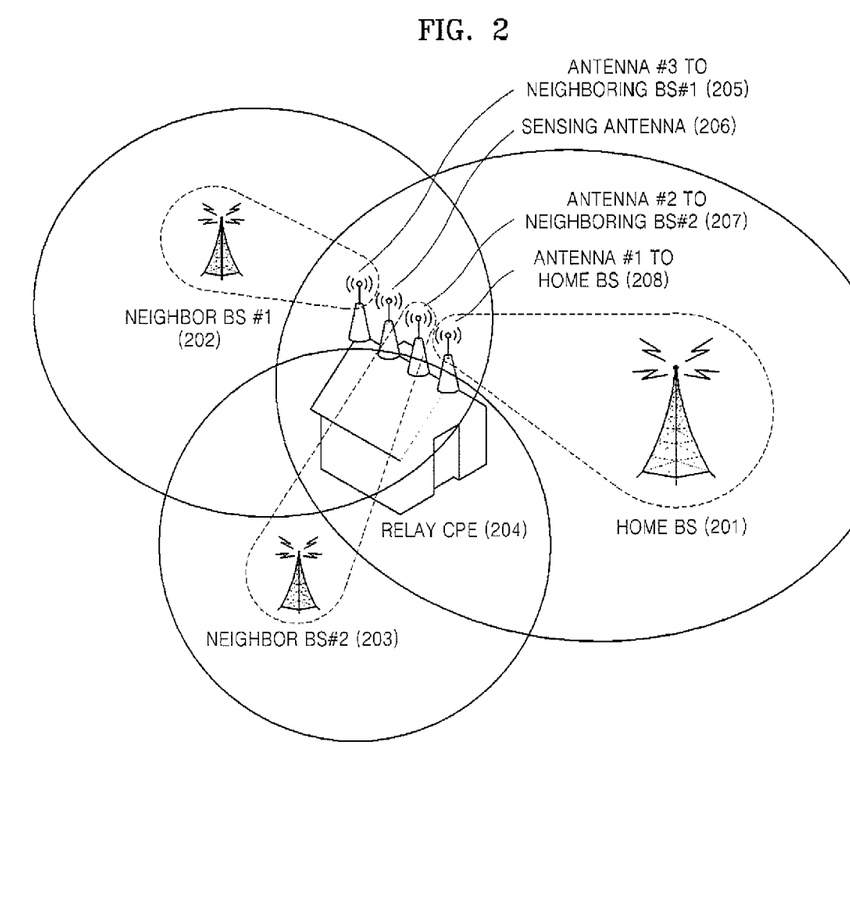
FIG. 2 illustrates an exemplary case when cell information is exchanged between three adjacent cells by using an RCPE in a cell overlap area, according to an embodiment of the present invention.

FIG. 2 illustrates an exemplary case when cell information is exchanged between three adjacent cells by using an RCPE in a cell overlap area, according to an embodiment of the present invention. The RCPE may simultaneously access BSs of the three adjacent cells so as to exchange information.

Referring to FIG. 2, an RCPE 204 is located in an overlap area of three cells, i.e., an overlap area of a home cell covered by a home BS 201 and neighboring cells separately covered by first and second neighboring BSs 202 and 203. The RCPE 204 includes first through third antennas 208, 207 and 205 respectively directed to the home BS 201, the second neighboring BS 203, and the first neighboring BS 202, and each of the first through third antennas 208, 207 and 205 is connected to its own transmitter (a physical (PHY)/MAC layers). The RCPE 204 may further include a sensing antenna 206. The RCPE 204 may directly communicate with the home BS 201 by using the first antenna 208, may directly communicate with the second neighboring BS 203 by using the second antenna 207, and may directly communicate with the first neighboring BS 202 by using the third antenna 205. The RCPE 102 may always effectively transmit operational/coexistence information among three adjacent BSs, i.e., the home BS 201 and the first and second neighboring BSs 202 and 203, by using the first through third antennas 208, 207 and 205. In order to correctly receive information, each of the first through third antennas 208, 207 and 205 may be adjusted to have an optimal gain independently from coverage of a corresponding BS.

Cases when two or three cells overlap each other are described above for convenience of explanation. However, it will be sufficiently understood by one of ordinary skill in the art that the present invention may also be applied to a case when four or more cells overlap each other. Also, although the number of cells overlapping each other increases, an RCPE may be designed to include an appropriate number of antennas in consideration of RCPEs of neighboring cells. Furthermore, one or more antennas may be used as beam-forming antennas of which directions are adjustable, so as to transmit data to a plurality of adjacent cells.

The RCPE may be located in an area where effective communication to all cells is enabled according to a geographical environment and cell design, that is, an area where communication performance is optimized, for example, a cell overlap area or a cell edge.

Figure 3:
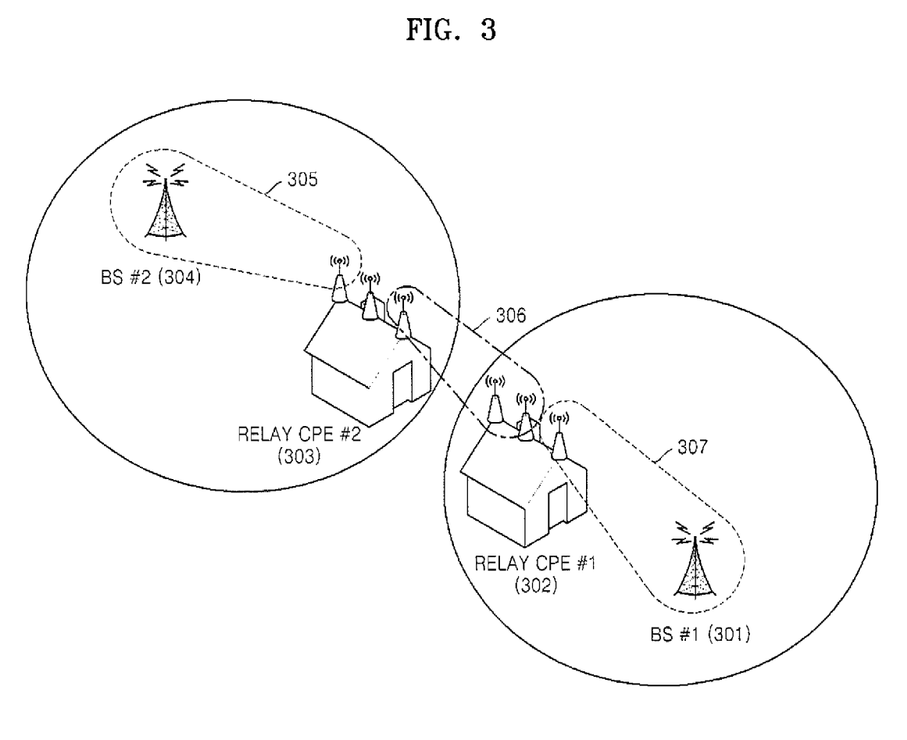
FIG. 3 illustrates an exemplary case when cell information is exchanged between adjacent cells by using an RCPE outside a cell overlap area, according to an embodiment of the present invention.

FIG. 3 illustrates an exemplary case when cell information is exchanged between adjacent cells by using an RCPE outside a cell overlap area, according to an embodiment of the present invention.

The RCPE determines whether a neighboring BS or a neighboring RCPE exists. If a neighboring BS signal is found, the RCPE may directly communicate with the neighboring BS. If a neighboring RCPE signal is found, the direct communication involves adjusting an antenna direction to be directed to the neighboring RCPE and receiving and storing the neighboring RCPE signal. If the received signal includes information required by a home BS, the RCPE transmits the information to the home BS. The home BS is synchronized with the neighboring BS based on the information received from the RCPE. As such, information between two BSs included in cells that do not overlap each other may be exchanged by using two RCPEs.

Referring to FIG. 3, a first BS 301 and a first RCPE 302 are located in the same cell, and a second BS 304 and a second RCPE 303 are located in the same cell. The cell including the second BS 304 does not overlap with the cell including the first BS 301. Each of the first and second RCPEs 302 and 303 includes two directional antennas. One of the two directional antennas is used to communicate with a home BS and the other one of the two directional antennas is used to communicate between the first and second RCPEs 302 and 303. Thus, due to mutual operation of the first and second RCPEs 302 and 303, operational/coexistence information may be transmitted even outside a cell overlap area. For example, the second RCPE 303 may transmit/receive information to/from the second BS 304 by using a first antenna via a generated link 305, and may transmit/receive information to/from the first RCPE 302 by using a second antenna via a generated link 306. The first RCPE 302 may transmit/receive information to/from the second RCPE 303 by using a first antenna via the generated link 306, and may transmit/receive information to/from the first BS 301 by using a second antenna via a generated link 307.

Figure 4:
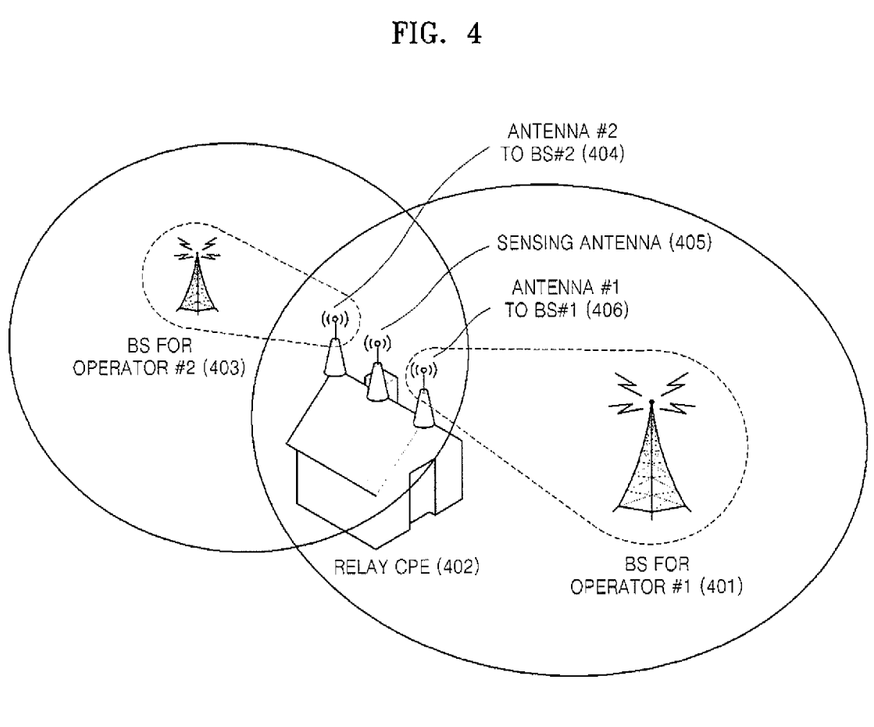
FIG. 4 illustrates an exemplary case when information of a neighboring cell is obtained by using an RCPE when a base station (BS) of the neighboring cell belongs to a different operator, according to an embodiment of the present invention.

FIG. 4 illustrates an exemplary case when information of a neighboring cell is obtained by using an RCPE when a BS of the neighboring cell belongs to a different operator, according to an embodiment of the present invention.

Referring to FIG. 4, a BS 401 and an RCPE 402 belongs to a first operator, and a BS 403 belongs to a second operator. The RCPE 402 may include first and second directional antennas 406 and 404 so as to form a link between the BS 401 for the first operator and the BS 403 for the second operator. The RCPE 402 may not be enabled to access the BS 403 for the second operator and thus only receives information of the BS 403 for the second operator by using an antenna 404. The RCPE 402 transmits the received information to the BS 401 for the first operator such that the BS 401 for the first operator may check operational/coexistence information of the BS 403 for the second operator.

Figure 5A:
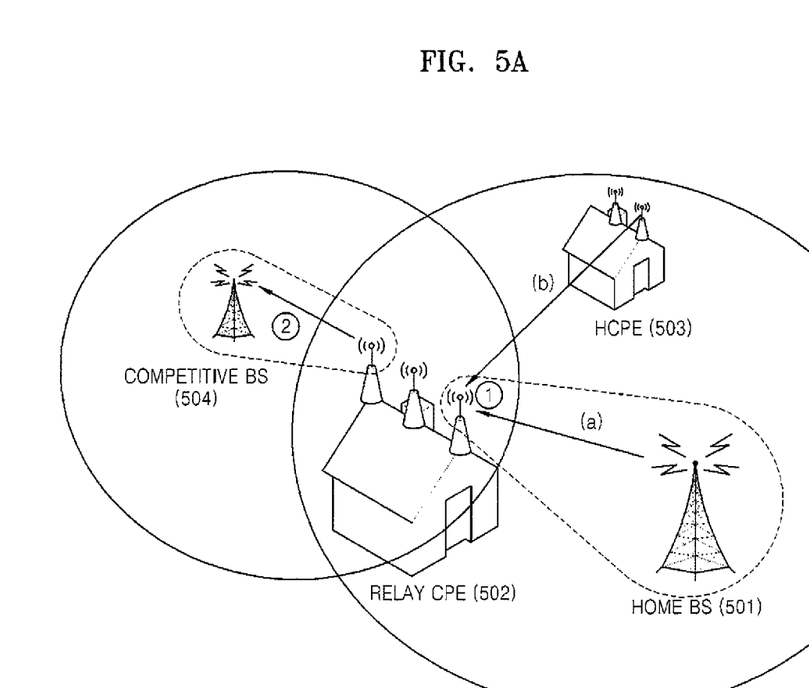
FIGS. 5A through 5C illustrate an exemplary case when information is transmitted to a neighboring cell by using an RCPE when a BS of the neighboring cell belongs to a different operator, according to an embodiment of the present invention.
Figure 5B:
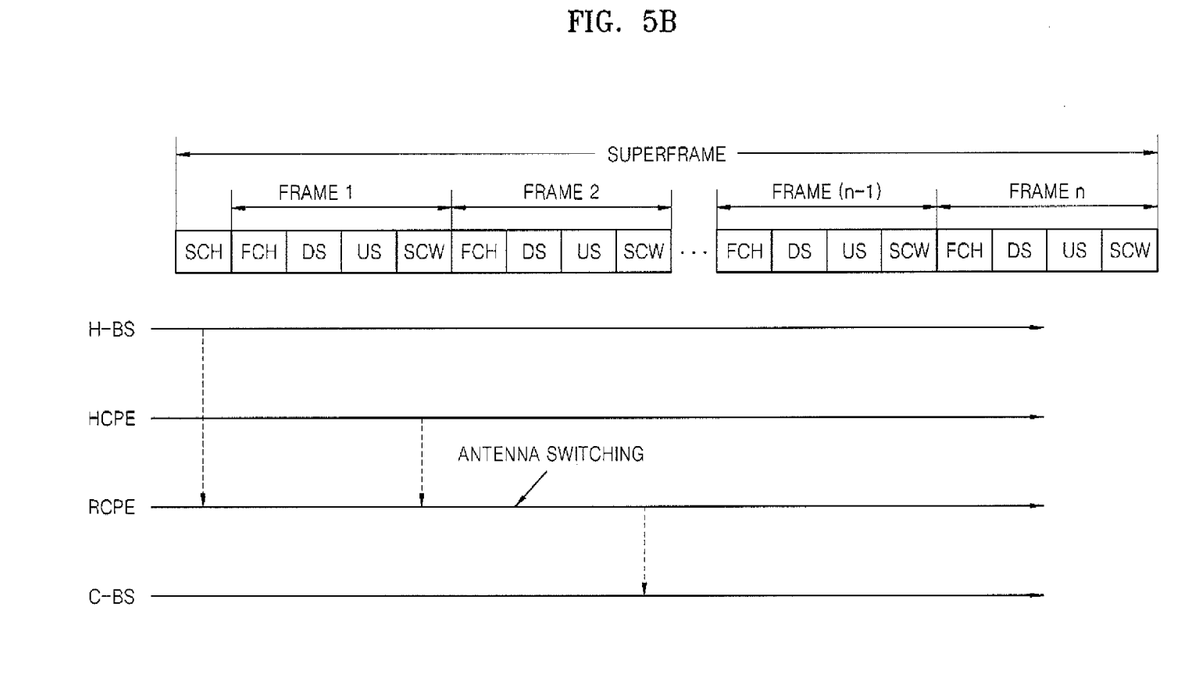
Figure 5C:
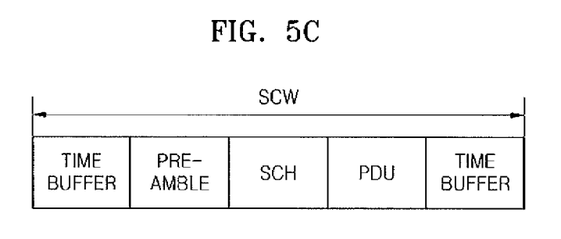

FIGS. 5A through 5C illustrate an exemplary case when information is transmitted to a neighboring cell by using an RCPE when a BS of the neighboring cell belongs to a different operator, according to an embodiment of the present invention.

The RCPE may transmit operational/coexistence information at a certain time agreed with the different operator without connecting or associating the BS of the different operator.

Referring to FIGS. 5A through 5C, an RCPE 502 uses a first antenna to receive operational/coexistence information from a home BS 501 (a) or to receive operational/coexistence information from another CPE which is associated with home BS 501, i.e., a Home CPE (HCPE) 503, located in the same cell as the RCPE 502 (b) (①). The HCPE 503 may receive and store information from the home BS 501 so as to transmit the information to the RCPE 502. A superframe includes n frames, each frame includes a frame control header (FCH) field, a downstream (DS) field, an upstream (US) field, and a self coexistence window (SCW) field, and a superframe control header (SCH) field is added to an initial frame. The home BS 501 transmits information to the RCPE 502 at the SCH field where the superframe starts, and the HCPE 503 transmits information to the RCPE 502 at the SCW field of the initial frame. The RCPE 502 uses a second antenna to transmit information to a competitive BS 504 in a cell for another operator at the SCW field of a next frame. The competitive BS 504 may receive information from the RCPE 502 so as to check the condition of a neighboring BS, i.e., the home BS 501, based on the received information.

Although the information transmission scheme illustrated in FIGS. 5B and 5C is exemplarily applied to the structure illustrated in FIG. 5A, it will be sufficiently understood by one of ordinary skill in the art that the information transmission scheme may also be applied to FIGS. 1 through 4.

Figure 6:
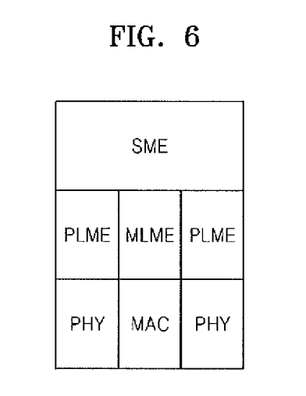
FIGS. 6 through 8 are schematic diagrams showing different examples of the internal structure of an RCPE, according to an embodiment of the present invention.
Figure 7:
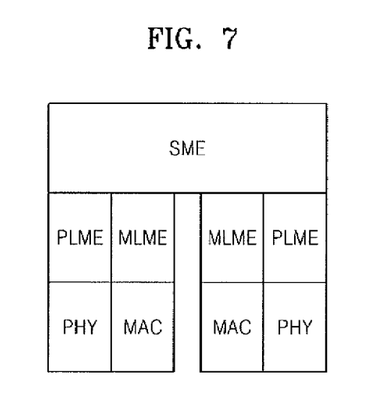
Figure 8:
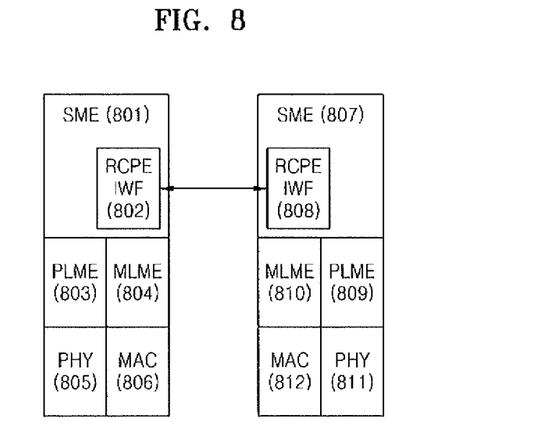

FIGS. 6 through 8 are schematic diagrams showing different examples of the internal structure of an RCPE, according to an embodiment of the present invention.

Referring to FIG. 6, the internal protocol stack structure of an RCPE includes one MAC layer, one MAC layer management entity (MLME), two PHY layers, two PHY layer management entities (PLMEs), and one station management entity (SME). The two PHY layers share one MAC address. The protocol stack structure requires a plurality of new MAC functions and SME functions, and a plurality of new interfaces are requested between the MAC layer and the PHY layers.

Referring to FIG. 7, the internal protocol stack structure of an RCPE includes two MAC layers, two MLMEs, two PHY layers, two PLMEs, and one SME. The SME manages the two MAC layers and the two PHY layers, and manages a sensing operation, a quiet period (QP), and channel settings regarding each of two channels if the two PHY layers operate at different frequencies.

Referring to FIG. 8, the internal protocol stack structure of an RCPE includes two MAC layers 806 and 812, two MLMEs 804 and 810, two PHY layers 805 and 811, two PLMEs 803 and 809, and two SMEs 801 and 807. One MAC layer, one MLME, one PHY, one PLME, and one SME may form a single transceiver, and the RCPE may include two or more transceivers. The SMEs 801 and 807 respectively control a transmission/reception unit including the PHY and MAC layers 805 and 806 and a transmission/reception unit including the PHY and MAC layers 811 and 812, and respectively have RCPE inter working functions (IWFs) 802 and 808 so as to enable organic operation between transceivers. An IWF is software and may be easily added and removed. Each transceiver receives cell information from at least one of two or more BSs and transmits the cell information to a BS corresponding to a transmission address of the cell information. Each transceiver may transmit/receive cell information to/from BSs by using an antenna having an adjustable transmission direction or individual antennas separately directed to the BSs. Transceivers are connected to each other by a cable interface that transmits cell information between SMEs (Station Management Entities) of the connected transceiver.

Figure 9:
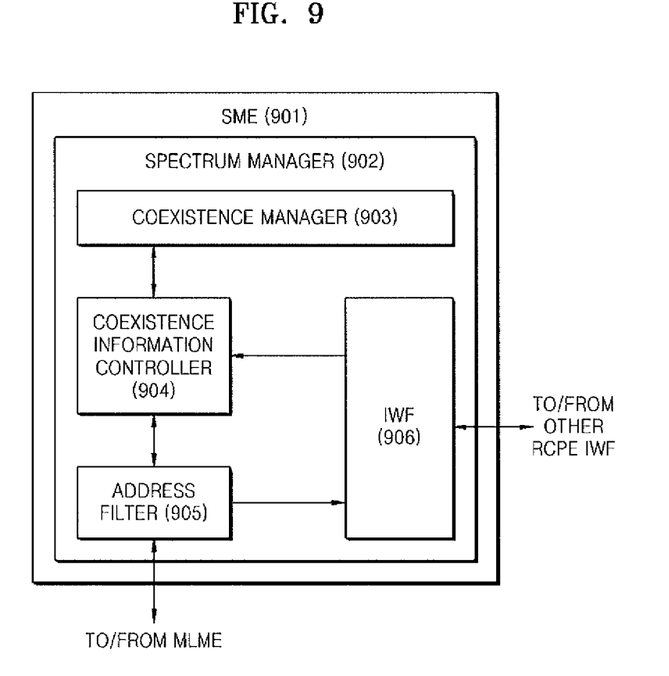
FIG. 9 is a schematic diagram showing the internal structure of a station management entity (SME) of a single transceiver, according to an embodiment of the present invention.

FIG. 9 is a schematic diagram showing the internal structure of an SME of a single transceiver, according to an embodiment of the present invention. The single transceiver illustrated in FIG. 9 may also be applied to another transceiver in an RCPE.

Referring to FIG. 9, an SME 901 includes a spectrum manager 902 including a coexistence manager 903, a coexistence information controller 904, an address filter 905, and an IWF execution unit 906.

The address filter 905 checks a transmission address of operational/coexistence information received from an MLME. The address filter 905 determines whether the transmission address of the operational/coexistence information corresponds to a home BS or a neighboring BS to which an antenna of another connected transceiver is directed. The address filter 905 transmits the operational/coexistence information to the coexistence manager 903 via the coexistence information controller 904 if the transmission address corresponds to the home BS, and transmits the operational/coexistence information to the IWF execution unit 906 if the transmission address corresponds to the neighboring BS.

The coexistence information controller 904 transfers the operational/coexistence information received from the address filter 905 to the coexistence manager 903. The coexistence information controller 904 converts variables of the received operational/coexistence information so as to be easily decoded by the coexistence manager 903. For example, the coexistence information controller 904 converts a primitive format from an MLME into an input value of the coexistence manager 903. The coexistence information controller 904 receives operational/coexistence information from another transceiver via the IWF execution unit 906 and transmits the operational/coexistence information to the coexistence manager 903.

The coexistence manager 903 manages the operational/coexistence information. The coexistence manager 903 compares the received operational/coexistence information to existing information so as to reprocess and update the information. Also, if the updated information is determined to be shared with another BS, the coexistence manager 903 may generate a packet (e.g., a CBP packet) containing the updated information so as to transmit the packet to the other BS.

The IWF execution unit 906 receives the operational/coexistence information from the address filter 905 and transmits the operational/coexistence information to an IWF execution unit of another transceiver that communicates with the BS corresponding to the transmission address of the operational/coexistence information, and receives cell information, of which a transmission address corresponds to the home BS, from the other transceiver. Information transference between IWF execution units of two transceivers is performed via a physical interface. The IWF execution unit 906 generates a primitive regarding the operational/coexistence information periodically or when needed. If an interruption message notifying that the operational/coexistence information has arrived from the address filter 905 is generated, the IWF execution unit 906 may process the interruption message immediately or later after storing the interruption message in a queue.

Figure 10:
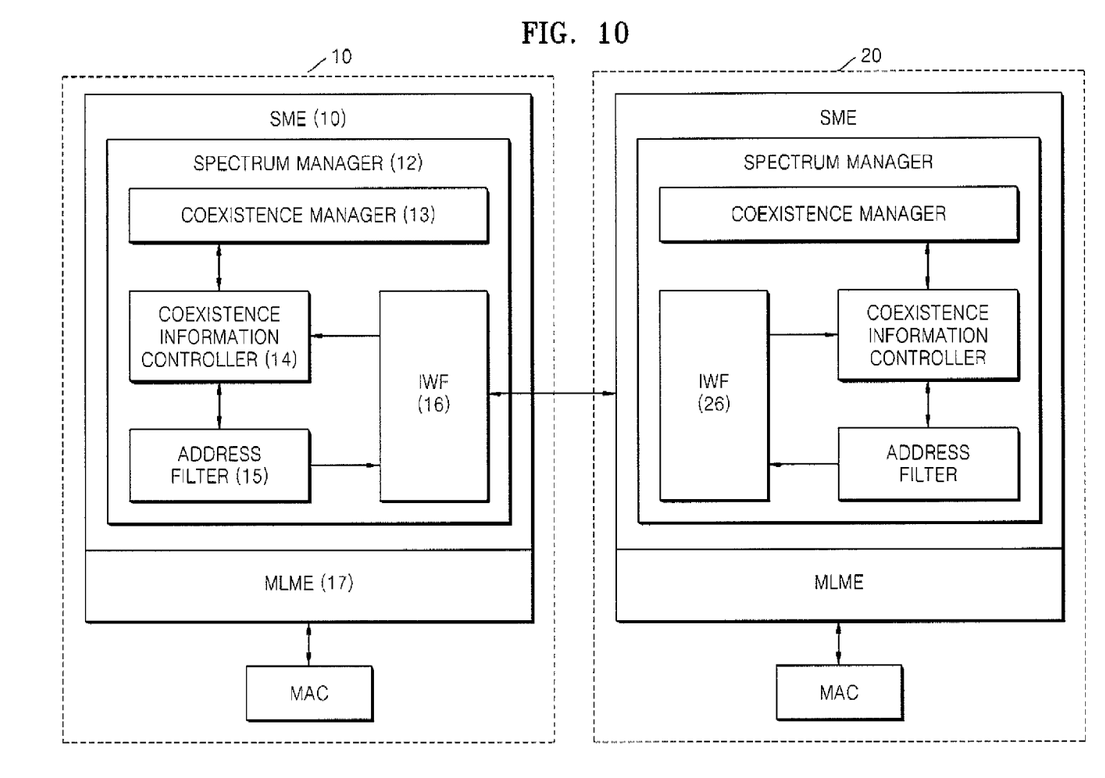
FIG. 10 is a schematic diagram showing an information transmission/reception process in an RCPE, according to an embodiment of the present invention.

FIG. 10 is a schematic diagram showing an information transmission/reception process in an RCPE, according to an embodiment of the present invention.

Referring to FIG. 10, portions of first and second transceivers 10 and 20 in an RCPE are illustrated and the internal structures of the first and second transceivers 10 and 20 are the same. Hereinafter, the first transceiver 10 will be representatively described and the same principal is applied to the second transceiver 20. Each of the first and second transceivers 10 and 20 may include one or more antennas as directional antennas or beam-forming antennas. Hereinafter, it is assumed that the first transceiver 10 includes an antenna directed to a first BS and the second transceiver 20 includes an antenna directed to a second BS.

First, processing of operational/coexistence information by a spectrum manager 12 of an SME 11 when the first transceiver 10 receives the operational/coexistence information via a MAC layer will be described.

An address filter 15 receives the operational/coexistence information from an MLME 17 and checks a transmission address of the operational/coexistence information. The address filter 15 transmits the operational/coexistence information to an IWF execution unit 16 if the transmission address corresponds to the second BS, and transmits the operational/coexistence information to a coexistence information controller 14 if the transmission address corresponds to the first BS.

The coexistence information controller 14 transmits the operational/coexistence information to the coexistence manager 13. The IWF execution unit 16 transmits the operational/coexistence information to an IWF execution unit 26 of the second transceiver 20 via an interface.

Meanwhile, if operational/coexistence information is received from the IWF execution unit 26 of the second transceiver 20, the IWF execution unit 16 transmits the received operational/coexistence information to the coexistence manager 13 via the coexistence information controller 14.

The coexistence manager 13 reprocesses the operational/coexistence information according to a predetermined reprocessing method, and transmits the reprocessed operational/coexistence information to the address filter 15 via the coexistence information controller 14.

The address filter 15 checks that the transmission address of the received operational/coexistence information corresponds to the first BS and then transmits the operational/coexistence information to the MLME 17. The operational/coexistence information is transmitted to the first BS via MAC-PHY layers.

Also, if the operational/coexistence information reprocessed by the coexistence manager 13 has the transmission address corresponding to the second BS, the address filter 15 transmits the reprocessed operational/coexistence information to the IWF execution unit 16.

Next, processing of operational/coexistence information by the spectrum manager 12 of the SME 11 when the first transceiver 10 transmits the operational/coexistence information will be described.

If the operational/coexistence information is determined to be transmitted, the coexistence manager 13 transmits the operational/coexistence information to the coexistence information controller 14. The coexistence information controller 14 transmits the received operational/coexistence information to the address filter 15. The address filter 15 transmits the operational/coexistence information to the IWF execution unit 16 if a transmission address (of the operational/coexistence information) corresponds to the second BS, and transmits the operational/coexistence information to another CPE or another BS via an MLME and MAC-PHY layers if the transmission address corresponds to the other CPE or the other BS.

An RCPE according to the present invention may effectively transmit/receive operational/coexistence information in or outside a cell overlap area over air links in a cellular system by including a transmitter having individual antennas directed to BSs or one antenna having an adjustable transmission direction. Thus, unlike conventional technology of controlling a plurality of cells by transmitting/receiving information between cells over cable links, the present invention enables effective control between multiple cells by directly transmitting operational information and coexistence information between cells over air links.

Also, the present invention may increase transmission power efficiency and reduce unnecessary interference between an RCPE and a BS, and may provide an effective communication means between adjacent BSs, by using a directional antenna or a beam-forming antenna in an RCPE of a cellular system. As such, the present invention may provide effective control of an entire network through operational information exchange between cells and may improve sharing of spectrum information in a cognitive wireless system through coexistence information exchange.

Furthermore, easy transmission of operational information and coexistence information between adjacent cells may be ensured indefinitely by using an RCPE according to the present invention.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

The present invention has been particularly shown and described with reference to exemplary embodiments thereof. Certain terms used herein should be considered in a descriptive sense only and not for purposes of limitation.

Therefore, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. A relay customer premises equipment (RCPE) for cell information exchange between base stations (BSs), the RCPE comprising:
   a first transceiver which receives cell information from a first BS located in a first cell, by using a first antenna directed to the first BS; and
   a second transceiver which transmits the cell information to a second BS located in a second cell by using a second antenna directed to a neighboring RCPE in communication with the second BS, and wherein the first cell does not overlap with the second cell.

2. The RCPE of claim 1, wherein at least one of the first and second antennas is a directional antenna or a beam-forming antenna having an adjustable direction.

3. The RCPE of claim 1, further comprising an interface that connects the first and second transceivers to each other and transfers cell information between station management entities (SMEs) of the at least two transceivers.

4. The RCPE of claim 1, wherein the RCPE is located in an area where communication performance is optimized with respect to BSs with which the first and second transceivers communicate.

5. The RCPE of claim 1, wherein at least one of the BSs with which the first and second transceivers communicate belongs to a different operator.

6. The RCPE for cell information exchange between BSs of claim 1: wherein the RCPE transmits the cell information to a competitive BS identified by a self coexistence window of a super frame.

7. The relay customer premises equipment (RCPE) for cell information exchange between base stations (BSs) of claim 1, wherein the RCPE and the neighboring RCPE communicate by way of respective interworking functions (IWFs) of respective station management entities.

8. A method of exchanging cell information between base stations (BSs) by using relay customer premises equipment (RCPE), the method comprising:
   receiving cell information from a first BSs located in a first cell; and transmitting the cell information to a second BS located in a second cell, wherein the first cell does not overlap with the second cell, and wherein the cell information is communicated from a first RCPE located in the first cell to a second RCPE located in the second cell.

9. The method of claim 8, wherein the first and second RCPE's each include respective directional antennas or beam-forming antennas having adjustable directions directed to the first and second respective BSs.

10. The method of claim 8, wherein the first and second BSs belong to the same cell operator.

11. The method of claim 8, wherein the first and second BSs belong to different cell operators.

12. The method of claim 11, wherein the transmitting of the cell information comprises, if the BS corresponding to the transmission address of the cell information is a BS for a different cell operator, transmitting the cell information at a predetermined time without accessing the BS for the different cell operator.

13. A relay customer premises equipment (RCPE) for cell information exchange between base stations (BSs), the RCPE comprising: at least two transceivers each of which transmits/receives cell information to/from a certain BS by using an antenna directed to the certain BS and which transfer the cell information to each other, wherein each of the at least two transceivers comprises:
   an address filter that separates cell information having a transmission address corresponding to a home BS, from cell information having a transmission address corresponding to a BS with which another transceiver communicates: and
   an inter working function (IWF) execution unit that transmits the cell information having the transmission address corresponding to the BS with which the other transceiver communicates, to the other transceiver and receives the cell information having the transmission address corresponding to the home BS from the other transceiver, via the interface.

* * * * *